HARTELL & LANCASTER.

Heat Generator.

No. 616. Reissued Nov. 2, 1858.

N. PETERS, Photo-Lithographer, Washington, D. C.

UNITED STATES PATENT OFFICE.

THOMAS R. HARTELL, OF PHILADELPHIA, PENNSYLVANIA, ASSIGNEE OF WILLIAM HARTELL AND JOSEPH LANCASTER.

IMPROVEMENT IN THE MODE OF GENERATING HEAT.

Specification forming part of Letters Patent No. 9,419, dated November 23, 1852; Reisue No. 616, dated November 2, 1858.

*To all whom it may concern:*

Be it known that I, THOMAS R. HARTELL, of the city and county of Philadelphia, and State of Pennsylvania, have, by deed of assignment, become the owner of the right for the whole United States to an Improvement in the Mode of Generating Heat, for which Letters Patent of the United States, dated the 23d day of November, 1852, were granted to WILLIAM HARTELL and JOSEPH LANCASTER; and, whereas, by inadvertence or mistake the specification of the said patent is imperfect and insufficient, I hereby declare the following amended specification to be a full, clear, and exact description of the aforesaid invention, reference being had to the accompanying drawings, and to the letters of reference marked thereon.

The nature of the invention consists in the adaptation of or rendering available tar as a fuel for the production of the steady and intense heat required for various manufacturing purposes; and it consists in introducing water or the vapor thereof into the furnace in contact or combination with or in close proximity to the tar.

In order to enable others to practice my invention, I will now proceed to describe the manner in which I carry it into effect by applying it to an ordinary glass-furnace, to which the improvement is peculiarly well adapted.

Figure 1:
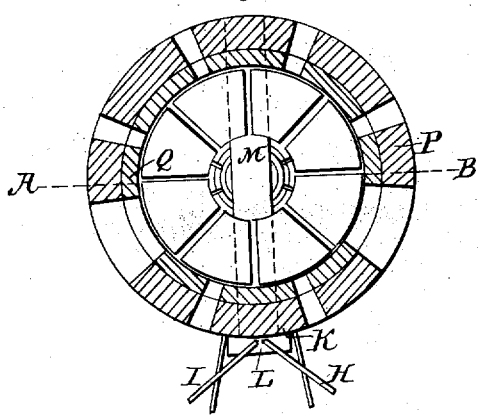
Figure 3:
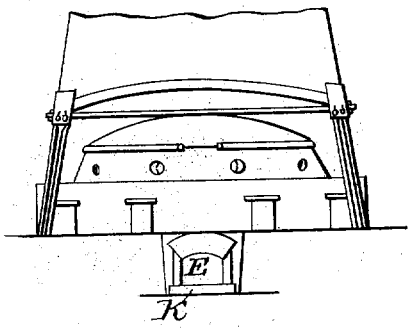
Figure 2:
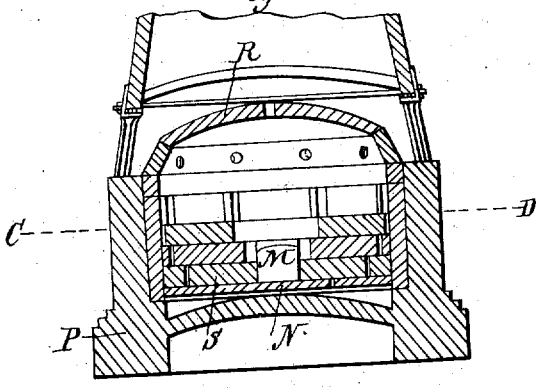
Figure 4:
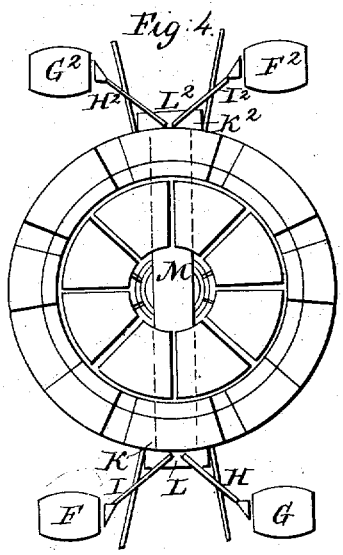

On reference to the accompanying drawings, which form a part of this specification, Figure 1 is a sectional plan of a glass-furnace on the line C D, Fig. 2, which line is level with benches; Fig. 2, a vertical section on the line A B, Fig. 1; Fig. 3, an exterior view of the furnace; Fig. 4, the same as Fig. 1, with the reservoirs for tar and water.

Similar letters refer to similar parts throughout the several views.

P represents the foundation of the furnace, Q, the fire-brick lining; R, the arched top, of the same material; S, the sandstone fire-place; E, (Fig. 2,) the opening in the side of the furnace for the reception of fuel. On each side of this opening, and at a suitable distance from the same, are two vessels or reservoirs, F and G, one for containing the tar and the other for the water.

To the reservoir F is connected a pipe, I, and to the reservoir G a pipe, H, the opposite ends of the pipes terminating in close proximity to each other on the plate K, which forms the bottom of the opening E of the furnace. A similar arrangement of reservoirs and pipes may be situated on the opposite side of the furnace, as illustrated in Fig. 4. It should be understood that the reservoirs are placed at such an altitude that their contents may flow freely through the pipes H and I into the plate K, and thence onto the central slab, N, technically termed the "tone" of the furnace, the pipes being furnished with stop-cocks or other suitable appliances for regulating the flow of water and tar.

Any ordinary fuel may be used in the first instance to kindle a fire sufficient to ignite the tar, which is then, together with the water, allowed to flow into the tone N, when the combustion, owing to the presence of water, goes on with a rapidity sufficient to produce the required steady and intense heat.

It is impossible to state with accuracy the respective portions of tar and water to be used, as this must depend upon the purposes to which the heat is applied. It will be sufficient to observe that for an ordinary glass-furnace, similar to that above described, a stream of tar about the size of an ordinary quill and one of water somewhat less in size have been found amply sufficient in practice to maintain the furnace at the desired heat. By increasing the flow of water the combustion of the tar is increased, and by diminishing the flow of water combustion goes on more slowly. Care must be taken, however, that the flow of water is not increased to an extent sufficient to extinguish the flame, as this would thwart the object aimed at.

Although the improvement in the mode of generating heat has been illustrated and described as applied to glass-furnaces, it is equally applicable to other purposes—such as the burning of bricks and lime, smelting ores, generating steam, &c.

In adapting it to different purposes different modifications and arrangements will be required to carry the invention into effect. These, however, will readily suggest themselves to those engaged in the particular manufacture or process to which the improvement may be applied.

I do not desire to confine myself, therefore, to any precise arrangement of reservoirs and pipes for the tar and water, or to any particular construction of furnace; but,

I claim and desire to secure by Letters Patent—

The adaptation of or rendering available tar as a fuel for the production of the intense and steady heat required for the melting of glass and for other processes and manufactures by introducing water or the vapor of water into a furnace or fire-place, in contact, combination with, or in close proximity to the tar, substantially as herein set forth.

In testimony whereof I have signed my name to this specification before two subscribing witnesses.

THOS. R. HARTELL.

Witnesses:

HENRY HOWSON,

HENRY ODIORNE.